United States Patent
Mizoguchi

(10) Patent No.: US 10,838,654 B2
(45) Date of Patent: Nov. 17, 2020

(54) SEMICONDUCTOR DEVICE INCLUDING UFS SYSTEM FOR DATA TRANSFER

(71) Applicant: RENESAS ELECTRONICS CORPORATION, Tokyo (JP)

(72) Inventor: Daisuke Mizoguchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/368,555

(22) Filed: Mar. 28, 2019

(65) Prior Publication Data

US 2019/0317690 A1 Oct. 17, 2019

(30) Foreign Application Priority Data

Apr. 13, 2018 (JP) .................................. 2018-077765

(51) Int. Cl.
*G06F 3/06* (2006.01)
*G06F 13/38* (2006.01)

(52) U.S. Cl.
CPC .......... *G06F 3/0655* (2013.01); *G06F 3/0679* (2013.01); *G06F 13/382* (2013.01)

(58) Field of Classification Search
CPC .... G06F 3/0619; G06F 3/0623; G06F 3/0655; G06F 3/0679; G06F 13/382
See application file for complete search history.

(56) References Cited

U.S. PATENT DOCUMENTS

| | | | |
|---|---|---|---|
| 9,348,537 B2 | 5/2016 | Raviv et al. | |
| 2010/0146158 A1* | 6/2010 | Nishio | G06F 13/28 710/22 |
| 2014/0351456 A1* | 11/2014 | Sharifie | G06F 3/0613 710/5 |

FOREIGN PATENT DOCUMENTS

JP   2016-539429 A   12/2016

OTHER PUBLICATIONS

JEDEC Standard Universal Flash Storage (UFS) Version 2.1 (JESD220C), Mar. 2016.
JEDEC Standard Universal Flash Storage Host Controller Interface (UFSHCI) Version 2.1 (JESD223C), Mar. 2016.

* cited by examiner

*Primary Examiner* — Aracelis Ruiz
(74) *Attorney, Agent, or Firm* — McDermott Will & Emery LLP

(57) ABSTRACT

When contents of UFSHCI standard are directly implemented in a UFS host, a problem may occur such that read/write operations of a UFS device stop or contents of data are destroyed. A semiconductor device has a UFS host controller that performs data transfer with a universal flash storage (UFS) device. The semiconductor device includes a Run-Stop register that sets the UFS host controller into a processing possible state, a Door bell register that instructs the UFS host controller to perform transfer, and a ready bit that indicates whether or not the UFS host controller can perform processing of transfer request. When the Run-Stop register is cleared while the data transfer is in process, the UFS host controller prevents a next data transfer from being registered until the data transfer is completed.

14 Claims, 18 Drawing Sheets

FIG. 4

|  | Door Bell Reg. | Run-Stop Reg. | UTP Transfer Request Descriptor |
|---|---|---|---|
| BEFORE TRANSFER | 0 \| 0 \| ... \| 0 \| 0 | 0 | — |
| S1 | 0 \| 0 \| ... \| 0 \| 0 | 1 | — |
| S2 | 0 \| 0 \| ... \| 0 \| 0 | 1 | TRANSFER CONTENT 1 |
| S2 | 1 \| 0 \| ... \| 0 \| 0 | 1 | TRANSFER CONTENT 1 |
| S4~S9 | | | |
| S10 | 0 \| 0 \| ... \| 0 \| 0 | 1 | TRANSFER CONTENT 1 |

FIG. 6

| | Door Bell Reg. | Run-Stop Reg. | UTP Transfer Request Descriptor |
|---|---|---|---|
| BEFORE TRANSFER | 0, 0, ..., 0, 0 | 0 | — |
| S1 | 0, 0, ..., 0, 0 | 1 | — |
| S2 | 0, 0, ..., 0, 0 | 1 | TRANSFER CONTENT 1 |
| S2 | 1, 0, ..., 0, 0 | 1 | TRANSFER CONTENT 1 |
| S4~S12A | | | |
| S15A | 0, 0, ..., 0, 0 | 1 | TRANSFER CONTENT 1 |

FIG. 8

| | Door Bell Reg. | Run-Stop Reg. | UTP Transfer Request Descriptor |
|---|---|---|---|
| BEFORE TRANSFER | 0 \| 0 \| ... \| 0 \| 0 | 0 | — |
| S1 | 0 \| 0 \| ... \| 0 \| 0 | 1 | — |
| S2 | 0 \| 0 \| ... \| 0 \| 0 | 1 | TRANSFER CONTENT 1 |
| S2 | 1 \| 0 \| ... \| 0 \| 0 | 1 | TRANSFER CONTENT 1 |
| S6B | 1 \| 0 \| ... \| 0 \| 0 | 0 | TRANSFER CONTENT 1 |
| S7B | 0 \| 0 \| ... \| 0 \| 0 | 0 | TRANSFER CONTENT 1 |
| S10B | 0 \| 0 \| ... \| 0 \| 0 | 1 | TRANSFER CONTENT 1 |
| S11B | 0 \| 0 \| ... \| 0 \| 0 | 1 | TRANSFER CONTENT 2 |
| S11B | 1 \| 0 \| ... \| 0 \| 0 | 1 | TRANSFER CONTENT 2 |

FIG. 12

| | Door Bell Reg. | Run-Stop Reg. | Ready Bit | UTP Transfer Request Descriptor |
|---|---|---|---|---|
| BEFORE TRANSFER | 0 \| 0 \| ... \| 0 \| 0 | 0 | 1 | — |
| S1 | 0 \| 0 \| ... \| 0 \| 0 | 1 | 1 | — |
| S2 | 0 \| 0 \| ... \| 0 \| 0 | 1 | 1 | TRANSFER CONTENT 1 |
| S2,S3 | 1 \| 0 \| ... \| 0 \| 0 | 1 | 1 | TRANSFER CONTENT 1 |
| S13C | 0 \| 0 \| ... \| 0 \| 0 | 0 | 0 | TRANSFER CONTENT 1 |
| S14C | 0 \| 0 \| ... \| 0 \| 0 | 0 | 0 | TRANSFER CONTENT 1 |
| S14C | 0 \| 0 \| ... \| 0 \| 0 | 0 | 1 | TRANSFER CONTENT 1 |
| S15C | 0 \| 0 \| ... \| 0 \| 0 | 1 | 1 | TRANSFER CONTENT 1 |
| S16C | 0 \| 0 \| ... \| 0 \| 0 | 1 | 1 | TRANSFER CONTENT 2 |
| S16C | 1 \| 0 \| ... \| 0 \| 0 | 1 | 1 | TRANSFER CONTENT 2 |

FIG. 15

| | Door Bell Reg. | | | | Run-Stop Reg. | UTP Transfer Request Descriptor |
|---|---|---|---|---|---|---|
| BEFORE TRANSFER | 0 | 0 | ... | 0 | 0 | 0 | — |
| S1 | 0 | 0 | ... | 0 | 0 | 1 | — |
| S2 | 0 | 0 | ... | 0 | 0 | 1 | TRANSFER CONTENT 1 |
| S2 | 1 | 0 | ... | 0 | 0 | 1 | TRANSFER CONTENT 1 |
| S13D | 1 | 0 | ... | 0 | 0 | 1 | TRANSFER CONTENT 1 |
| S10 | 0 | 0 | ... | 0 | 0 | 0 | TRANSFER CONTENT 1 |
| S15D | 0 | 0 | ... | 0 | 0 | 1 | TRANSFER CONTENT 1 |
| S16D | 0 | 0 | ... | 0 | 0 | 1 | TRANSFER CONTENT 2 |
| S16D | 1 | 0 | ... | 0 | 0 | 1 | TRANSFER CONTENT 2 |

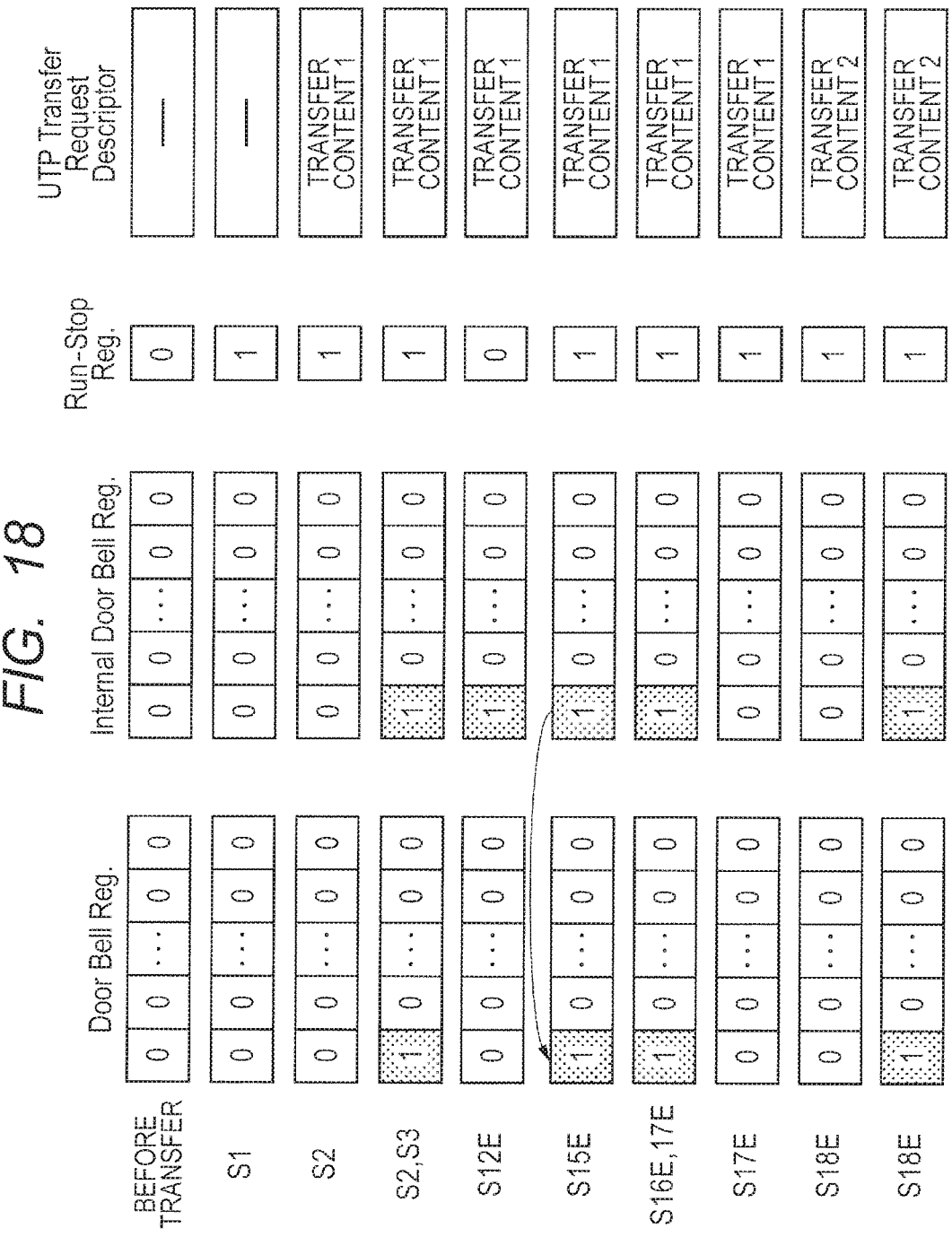

SEMICONDUCTOR DEVICE INCLUDING UFS SYSTEM FOR DATA TRANSFER

CROSS-REFERENCE TO RELATED APPLICATIONS

The disclosure of Japanese Patent Application No. 2018-077765 filed on Apr. 13, 2018 including the specification, drawings and abstract is incorporated herein by reference in its entirety.

BACKGROUND

The present disclosure relates to a semiconductor device. For example, the present disclosure can be applied to a semiconductor device including a host controller that performs read/write operations on a flash memory.

Flash memory compliant with a standard of eMMC (embedded Multi-Media Card) prescribed by JEDEC (Joint Electron Device Engineering Council) is widely used in a smartphone, a tablet, a digital camera, a car navigation system, and the like as a storage that stores data such as OS (Operating System). The eMMC standard uses a parallel interface and is difficult to increase operation frequency, so that as a successor standard, Universal Flash Storage (UFS) standard (JEDEC STANDARD Universal Flash Storage (UFS) Version 2.1 (JESD220C)) prescribed by JEDEC is designed. The UFS standard is a standard that defines a protocol and electrical characteristics for transmitting data between a host and a flash memory (device). In addition to this standard, Universal Flash Storage Host Controller Interface (UFSHCI) standard (JEDEC STANDARD Universal Flash Storage Host Controller Interface (UFSHCI) Version 2.1 (JESD223C)) is designed to improve reusability of OS and driver. The UFSHCI standard defines a register to be an interface to software, transfer instructed from the software, and control of data. JEDEC STANDARD Universal Flash Storage (UFS) Version 2.1 (JESD220C) discloses a UFS system including a host and a device.

SUMMARY

When the contents of the UFSHCI standard are directly implemented in a host compliant with both the UFS standard and the UFSHCI standard (hereinafter referred to as a UFS host), problems may occur such that read/write operations of a device such as a flash memory compliant with the UFS standard (hereinafter referred to as a UFS device) stop and/or contents of data are destroyed.

A typical example of the present disclosure will be briefly described as follows. A semiconductor device has a UFS host controller that performs data transfer with a universal flash storage (UFS) device. The semiconductor device includes a Run-Stop register that sets the UFS host controller into a processing possible state, a Door bell register that instructs the UFS host controller to perform transfer, and a ready bit that indicates whether or not the UFS host controller can perform processing of transfer request. When the Run-Stop register is cleared while the data transfer is in process, the UFS host controller prevents a next data transfer from being registered until the data transfer is completed.

According to the semiconductor device described above, it is possible to avoid the problems.

BRIEF DESCRIPTION OF THE DRAWINGS

FIG. 4 is a diagram showing values of registers and UTP transfer request descriptor in the write operation in FIG. 3.

FIG. 6 is a diagram showing values of registers and UTP transfer request descriptor in the write operation in FIG. 5.

FIG. 8 is a diagram showing values of registers and UTP transfer request descriptor in the write operation in FIG. 7.

FIG. 12 is a diagram showing values of registers and UTP transfer request descriptor in the write operation in FIG. 11.

FIG. 15 is a diagram showing values of registers and UTP transfer request descriptor in the write operation in FIG. 14.

FIG. 18 is a diagram showing values of registers and UTP transfer request descriptor in the write operation in FIG. 17.

DETAILED DESCRIPTION

Hereinafter, an embodiment, examples, and a comparative example will be described with reference to the drawings. However, in the description below, the same components are denoted by the same reference symbols, and repetitive descriptions may be omitted.

Figure 1:
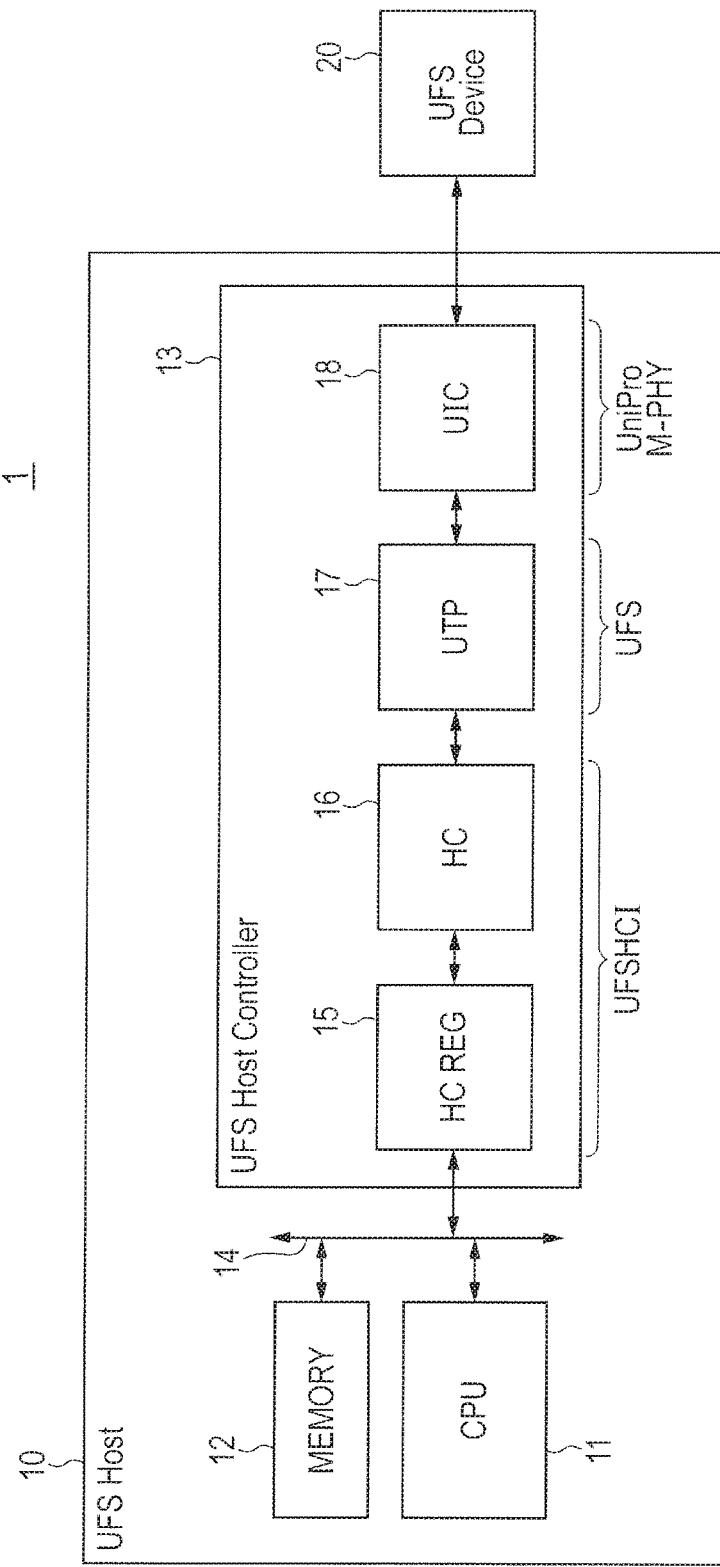
FIG. 1 is a block diagram showing a configuration of a UFS system of an embodiment.

First, a system compliant with the UFS standard and the UFSHCI standard (hereinafter referred to as a UFS system) will be described with reference to FIG. 1. FIG. 1 is a block diagram showing a configuration of the UFS system of the embodiment.

A UFS system 1 includes a UFS host 10 and a UFS device 20. The UFS host 10 is a semiconductor device including a CPU 11, a memory 12, a UFS host controller 13, and a bus 14 in a single semiconductor chip. The UFS host controller 13 is compliant with the UFS standard and the UFSHCI standard and includes a register group (HC REG) 15, a transfer control unit (HC) 16, a transfer protocol unit (UTP) 17, and a communication interface (UIC) 18. The communication interface 18 is included of a link layer compliant with the UniPro standard and a physical layer compliant with the M-PHY standard. The UFS device 20 is included of a flash memory and a controller including a communication interface.

Software (applications and drivers) of the UFS host 10 is stored in the memory 12 or a memory not shown in the drawings and executed by the CPU 11. The CPU 11 uses UTP Transfer Request Descriptor in the memory 12 along with the register group 15 arranged in a memory map I/O space in order to communicate with the UFS host controller 13. The register group will be described with reference to FIG. 2.

Figure 2:
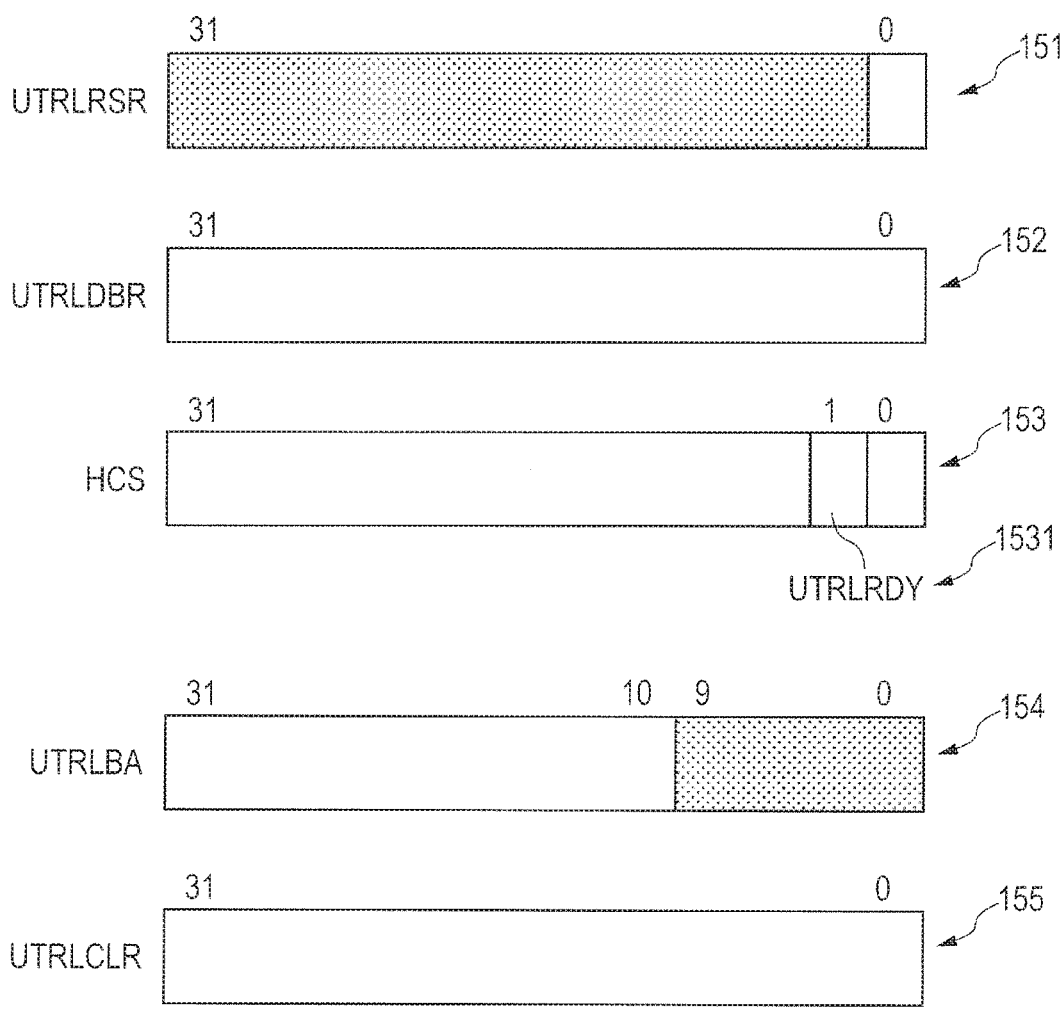
FIG. 2 is a diagram showing registers included in a register group in FIG. 1.

FIG. 2 is a diagram showing registers included in the register group in FIG. 1.

Although the register group 15 includes registers defined by the UFSHCI standard, registers mainly related to the present disclosure are a Run-Stop register 151 and a Door bell register 152 as shown in FIG. 2. In addition, a ready bit 1531 of a host controller status register 153, a Base Address register 154, and a request clear register 155 are related to the present disclosure.

The Run-Stop register 151 is UTRLRSR (UTP Transfer Request List Run-Stop Register) defined in 5. 4. 5 on page 23 of JEDEC STANDARD Universal Flash Storage Host Controller Interface (UFSHCI) Version 2.1 (JESD223C). The Door bell register 152 is UTRLDBR (UTP Transfer Request List Door Bell Register) defined in 5. 4. 3 on page 23 of JEDEC STANDARD Universal Flash Storage Host Controller Interface (UFSHCI) Version 2.1 (JESD223C). The ready bit 1531 of the host controller status register 153 is UTRLRDY (UTP Transfer Request List Ready) of HCS (Host Controller Status) defined in 5. 3. 3 on page 17 of JEDEC STANDARD Universal Flash Storage Host Controller Interface (UFSHCI) Version 2.1 (JESD223C). The Base Address register 154 is UTRLBA (UTP Transfer Request List Base Address) defined in 5. 4. 1 on page 22 of JEDEC STANDARD Universal Flash Storage Host Controller Interface (UFSHCI) Version 2.1 (JESD223C). The request clear register 155 is UTRLCLR UTP Transfer Request List Clear Register) defined in 5. 4. 4 on page 23 of JEDEC STANDARD Universal Flash Storage Host Controller Interface (UFSHCI) Version 2.1 (JESD223C). Hereinafter, partial definitions of the above related to the present disclosure will be described.

Although the Run-Stop register 151 is a 32-bit length register, only the bit 0 is used. The CPU 11 writes 1 to the Run-Stop register 151 when the transfer control unit 16 is set to a processing possible state (a state of performing transfer), and the CPU 11 writes to 0 to the Run-Stop register 151 when the transfer control unit 16 is set to a state of not performing transfer. Even when the Run-Stop register 151 is cleared to 0, the transfer control unit 16 performs transfer until completing all transfer requests, and thereafter, the transfer control unit 16 stops. The Run-Stop register 151 is set to 1 only when the ready bit 1531 is set to 1.

When a content to be transferred is prepared and registered, the CPU 11 set 1 to the Door bell register 152 to instruct the transfer control unit 16 to start transfer. The Door bell register 152 is included of 32 bits, and 32 transfers can be registered in the Door bell register 152. When a registered transfer is completed, the transfer control unit 16 clears a bit of the completed transfer. The Door bell register 152 is set to 1 or 0 only when the Run-Stop register 151 is set to 1. When the Run-Stop register 151 is changed from 1 to 0 by the CPU 11, the Door bell register 152 is cleared to 0.

The ready bit 1531 is arranged to bit 1 of the host controller status register 153 and indicates whether or not the UFS host controller 13 can perform processing of UTP transfer request. The ready bit 1531 is set by the transfer control unit 16.

The Base Address register 154 is a base physical address for UTP Transfer Request List and is used when a command to be executed is fetched.

The request clear register 155 is used by the software of the UFS host 10 when the software of the UFS host 10 receives a task management response that means that a transfer request is interrupted (aborted), that is, when it is anticipated that the UTP transfer request is not completed.

As shown in 4. 2 on page 6 of JEDEC STANDARD Universal Flash Storage Host Controller Interface (UFSHCI) Version 2.1 (JESD223C), UTP Transfer Request List and UTP Task Management Request List are stored in the memory 12. The UTP Transfer Request List can store up to 32 UTP Transfer Request Descriptors. Each UTP Transfer Request Descriptor includes address information for accessing PRDT (Physical Region Description Table) including a base address for accessing a command (Command UPIU), a response (Response UPIU), and a data buffer (Data Buffer). UTP task management request list can store up to 32 UTP task management requests and UTP task management responses.

Next, a protocol information unit of the transfer protocol unit 17 will be described. Communication between the UFS host 10 and the UFS device 20 is divided into a series of messages. These messages are formatted into UFS Protocol Information Units (UPIU) defined by JEDEC STANDARD Universal Flash Storage (UFS) Version 2.1 (JESD220C). The UPIU includes a command (Command), a data output (Data Out UPIU), a response (Data Out UPIU), a task management request (Task Management Request UPIU), a task management response (Task Management Response UPIU), an RTT (Ready To Transfer), and the like.

All the UPIUs (received data/response) described in the present disclosure has a task tag (Task Tag) field. Only the UPIUs whose task tag is the same as that mounted on UPIU are transferred, and UPIUs whose task tag is different are discarded. The task tag is a number to be incremented, and the same task tag cannot be used by different transactions.

Figure 3:
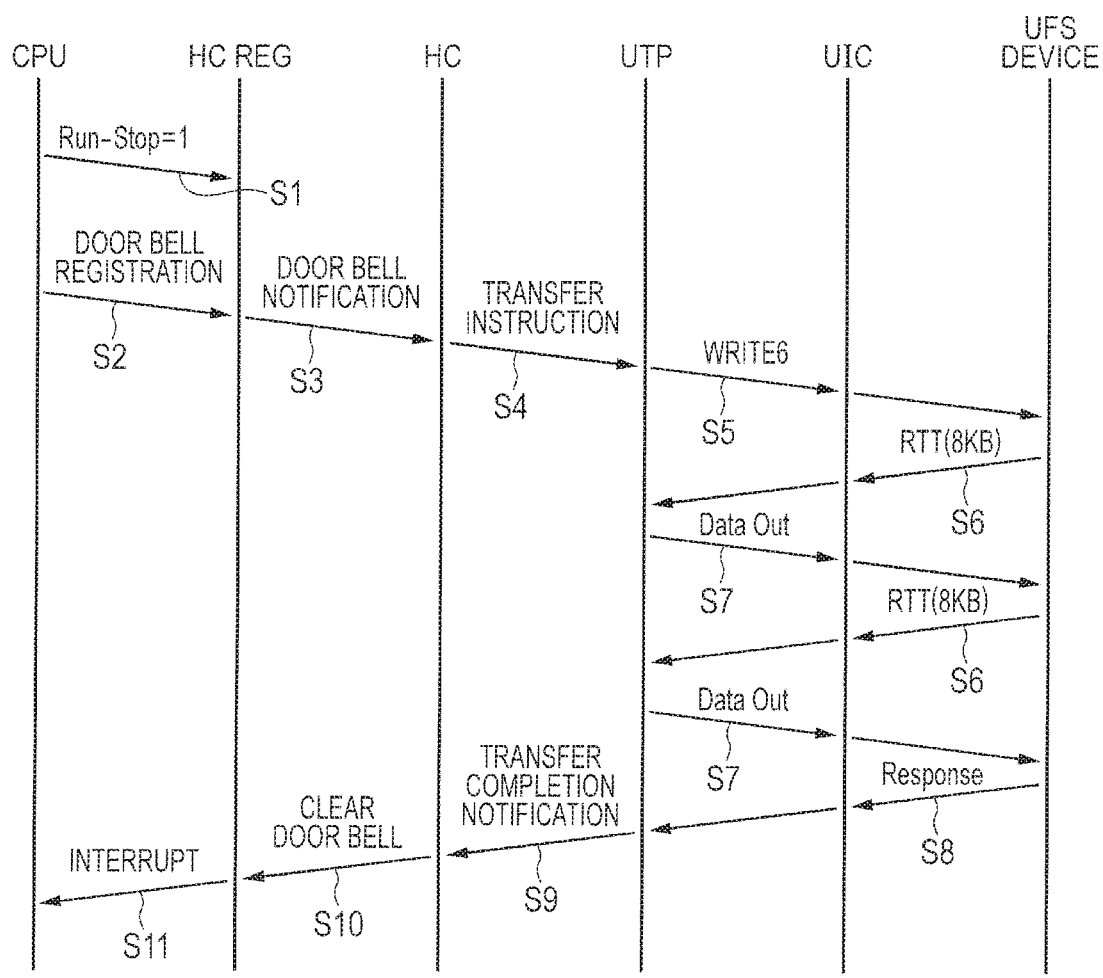
FIG. 3 is a flow diagram showing a write operation of 16 Kbytes.

The embodiment relates to interruption of write operation to the UFS device 20. An operation example when the UFS host 10 writes data to the UFS device 20 will be described with reference to FIGS. 3 and 4. FIG. 3 is a flow diagram showing a write operation of 16 Kbytes. FIG. 4 is a diagram showing values of registers and UTP transfer request descriptor in the write operation in FIG. 3.

Step S1: the UFS host 10 writes 1 to the Run-Stop register 151 and notifies the transfer control unit 16 of execution of transfer. Before writing 1 to the Run-Stop register 151, the UFS host 10 reads the ready bit 1531 of the host controller status register 153 and checks whether or not the transfer control unit 16 is prepared. Only when the ready bit 1531 is 1, 1 can be written to the Run-Stop register 151.

Step S2 (door bell registration): The CPU 11 that executes an application prepares the UTP Transfer Request List, where transfer contents such as data to be written and content to be written (size and the like) are described, on the memory 12. As shown in FIG. 4, in the present example, transfer content 1 is written to one UTP Transfer Request Descriptor of the UTP Transfer Request List. The CPU 11 that executes a driver issues an instruction to start transfer by writing an address of the UTP Transfer Request List to the Base Address register 154 and sets 1 to the Door bell register 152. In this case, the CPU 11 starts transfer by writing 1 to the Door bell register 152 corresponding to a location (slot) written in the UTP Transfer Request List.

Step S3 (door bell notification): Contents written to the Door bell register 152 and the Base Address register 154 are notified to the transfer control unit 16.

Step S4 (transfer instruction): Based on contents of the register group 15, the transfer control unit 16 acquires the UTP Transfer Request Descriptor, instructs the transfer protocol unit 17 to perform transfer, and prepares write data (reads data from the memory 12 and sends the data to the transfer protocol unit 17).

Step S5: the transfer protocol unit 17 instructs the UFS device 20 to perform write. In this case, the transfer protocol unit 17 writes a WRITE6 command defined by the SCSI standard to a command (Command UPIU) defined by the UFS standard and transmits the command. The command (Command UPIU) is transmitted to the UFS device 20 through the communication interface (UIC) 18. In this example, the size of data to be written is 16 Kbytes.

Step S6: After the UFS device 20 receives the WRITE6 command, when writing preparation becomes ready, the UFS device 20 notifies the UFS host 10 of the size of data that can be written by RTT (Ready To Transfer UPIU). In this example, the UFS device 20 notifies the UFS host 10 of 8 Kbytes by RTT. Write of a total of 16 Kbytes is performed by two RTTs.

Step S7: The transfer protocol unit 17 adds data of a size indicated by the RTT to a data output (Data Out UPIU) and transmits the data output to the UFS device 20. In this example, the transfer protocol unit 17 transmits two 8-Kbyte data outputs (Data Out UPIUs).

Step S8: When data of an indicated size from the UFS host 10 has been written, the UFS device 20 transmits a response (Response UPIU).

Step S9: When the transfer protocol unit 17 receives the response (Response UPIU), the transfer protocol unit 17 notifies the transfer control unit 16 of completion of transfer.

Step S10: When receiving a transfer completion notification, the transfer control unit 16 clears the Door bell register 152. An interrupt to the CPU 11 is asserted by the clear.

Step S11: When the interrupt enters the CPU 11, the CPU 11 recognizes that the transfer is completed.

Figure 5:
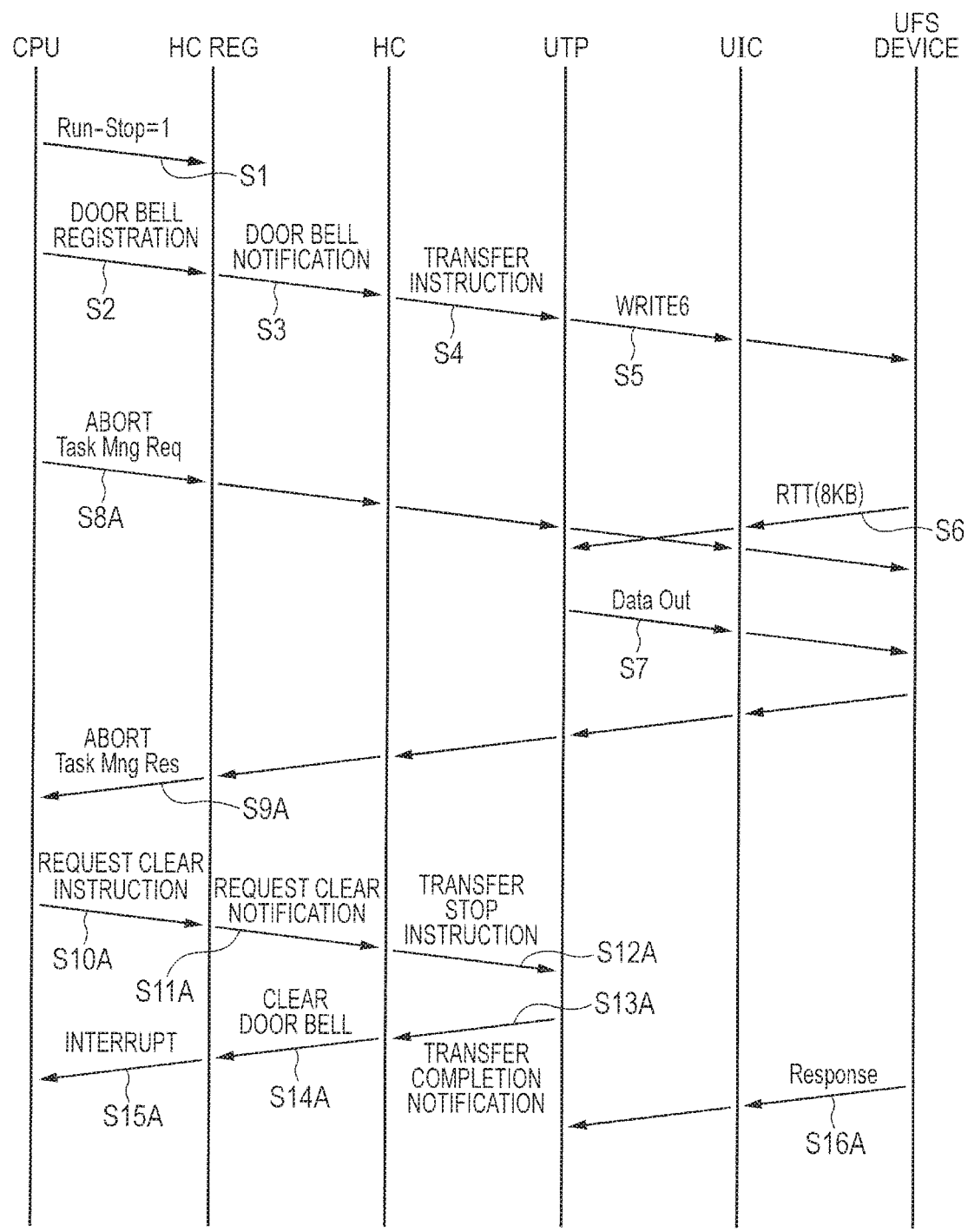
FIG. 5 is a flow diagram showing an example of a case where abort is preformed in the middle of the write operation in FIG. 3.

When the software of the UFS host 10 wants to interrupt transfer that has already been started for any reason, the software can interrupt the transfer by notifying the UFS device 20 of abort (ABORT) by task management (Task Management Request UPIU) and thereafter writing 0 to the request clear register 155 in the register group 15. This operation will be described with reference to FIGS. 5 and 6. FIG. 5 is a flow diagram showing an example of a case where abort is preformed in the middle of the write operation in FIG. 3. FIG. 6 is a diagram showing values of registers and UTP transfer request descriptor in the write operation in FIG. 5.

Steps S1 to S7 are the same as those of the write operation of FIG. 3.

Step S8A: In this example, after registering the Door bell register 152, the CPU 11 that executes the application intends to interrupt the transfer and registers a task management request (Task Management Request UPIU) of abort (ABORT).

Step S9A: When the UFS device 20 receives the task management request (Task Management Request UPIU) of abort, receives interrupt of the transfer, and accepts the interrupt, the UFS device 20 transmits a task management response (Task Management Response UPIU) of abort and notifies the CPU 11 that executes the application of completion of the interrupt. According to the UFS standard, all data requested by the RTT must be received before the completion of transfer is notified (lines 1521 to 1524 on page 73 of JEDEC STANDARD Universal Flash Storage (UFS) Version 2.1 (JESD220C). After the interrupt, issuance of new RTT is prohibited. In the present example, only the first RTT is notified.

Step S10A: The CPU 11 that executes the application for which completion of the interrupt is notified clears the request clear register 155.

Step S11A: The clear of the Door bell register 152 is notified to the transfer control unit 16.

Step S12A: The transfer control unit 16 receives the clear notification of the request clear register 155 and issues a transfer stop instruction to the transfer protocol unit 17.

Step S13A: The transfer protocol unit 17 waits until a data output (Data Out UPIU) to which data of a size indicated by the received RTT is added is transmitted, and when the transmission is completed, the transfer protocol unit 17 notifies the transfer control unit 16 of a transfer completion notification. In the present example, the data output (Data Out UPIU) is transmitted in step S7.

Step S14A: The transfer control unit 16 clears the Door bell register 152.

Step S15A: When the Door bell register 152 is cleared, a transfer completion interrupt is notified to the CPU 11 that executes the application.

Step S16A: In this example, a response (Response UPIU) of WRITE6 is transmitted by the UFS device 20 after the Door bell register 152 is cleared. However, the response (Response UPIU) is ignored by the transfer protocol unit 17.

Problems found by the inventor of the present application will be described below.

The last sentence of 5.4.3 on page 23 of JEDEC STANDARD Universal Flash Storage Host Controller Interface (UFSHCI) Version 2.1 (JESD223C) defines that when UTRLRSR (Run-Stop register) is changed from 1 to 0, UTRLDBR (Door bell register) is cleared. On the other hand, in 5.4.5 on page 23 of JEDEC STANDARD Universal Flash Storage Host Controller Interface (UFSHCI) Version 2.1 (JESD223C), it is defined that even when the UTRLRSR is cleared to 0, a registered transfer is executed.

In these definitions, when the Run-Stop register is cleared during a write operation to the UFS device 20, a contradiction of information occurs between the transfer control unit 16, transfer content on a memory, and the UFS device 20, so that an operation may stop or contents of data may be destroyed. Contents of the problems vary depending on implementation of the transfer control unit 16 and the transfer protocol unit 17.

Figure 7:
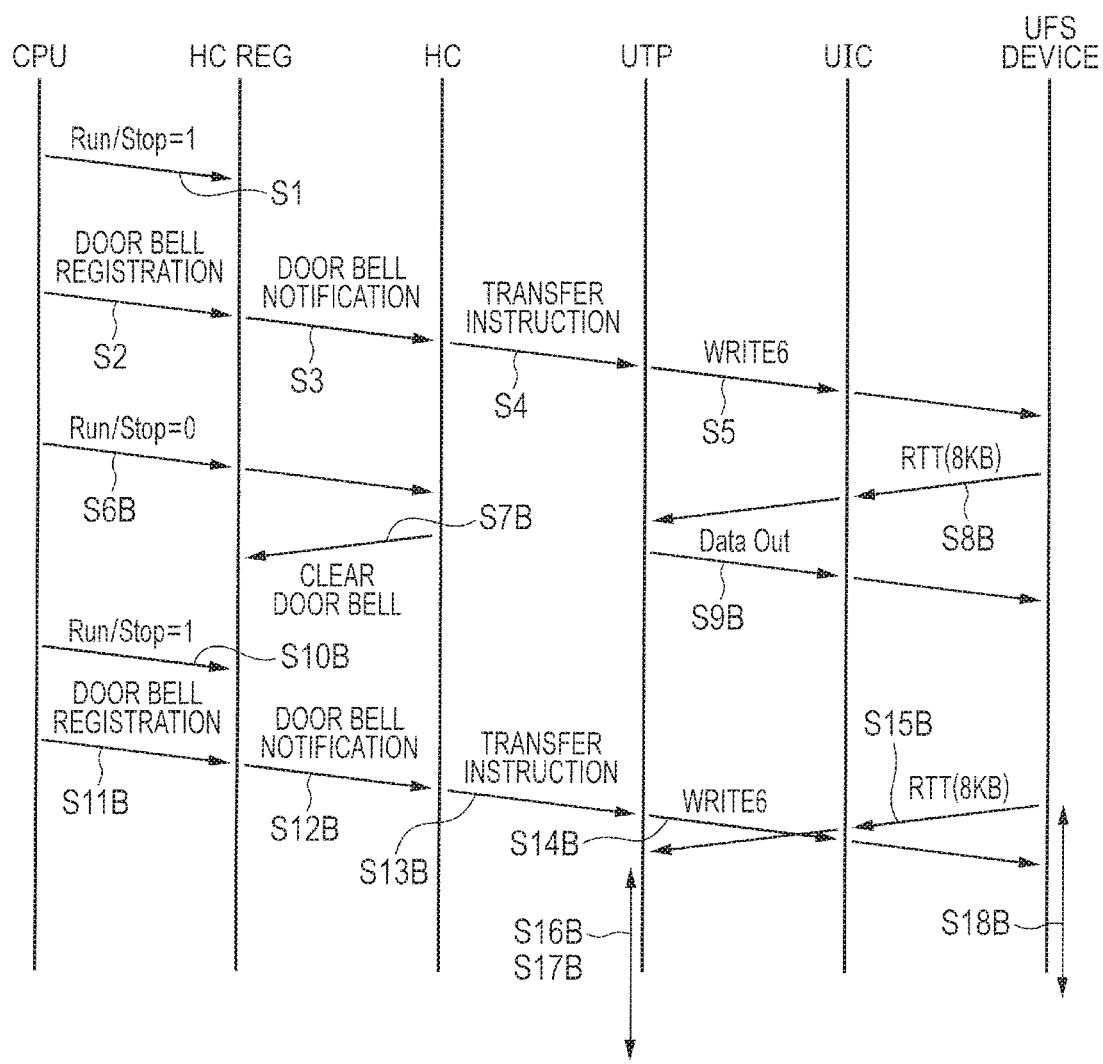
FIG. 7 is a flow diagram showing an example of a case where an Run-Stop register is cleared in the middle of the write operation in FIG. 3.
Figure 9:
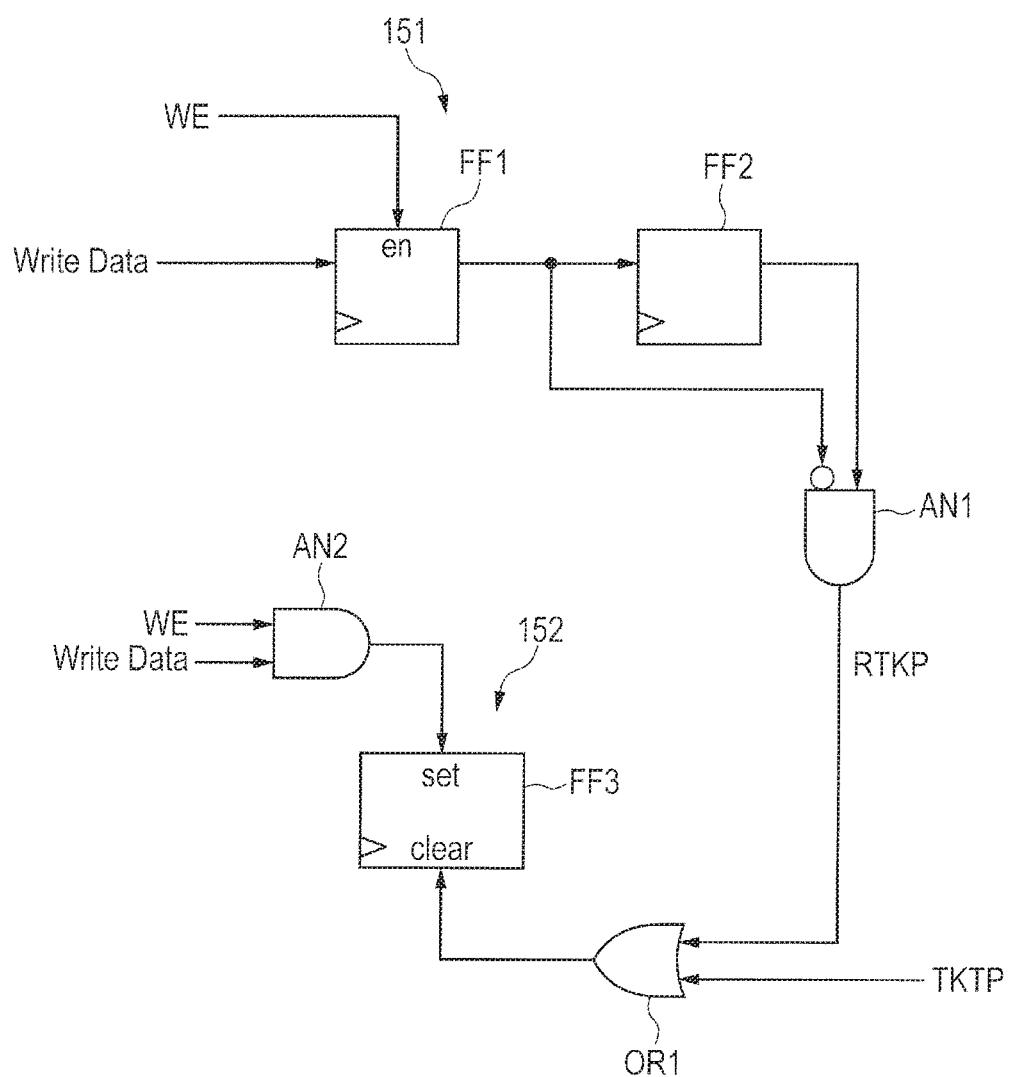
FIG. 9 is a logic circuit diagram showing a Run-Stop register, a door bell register, and their control system of a comparative example.

An example where the transfer control unit 16 and the transfer protocol unit 17 receive the next door bell registration will be described with reference to FIGS. 7 and 8. FIG. 7 is a flow diagram showing an example of a case where an Run-Stop register is cleared in the middle of the write operation in FIG. 3. FIG. 8 is a diagram showing values of registers and UTP transfer request descriptor in the write operation in FIG. 7. FIG. 9 is a logic circuit diagram showing a Run-Stop register, a door bell register, and their control system of a comparative example.

Steps S1 to S5 are the same as those of the write operation of FIG. 3.

Step S6B: The CPU 11 that executes the application writes 0 to the Run-Stop register 151 and instructs transfer stop.

Step S7B: The transfer control unit 16 clears the Door bell register 152 according to definition in 5. 4. 3 on page 23 of JEDEC STANDARD Universal Flash Storage Host Controller Interface (UFSHCI) Version 2.1 (JESD223C). In the standard, it is described that the Door bell register 152 is quickly cleared, so that it is considered that a configuration as shown in FIG. 9 is employed.

A falling edge detection circuit included of a flip-flop FF2 and an AND gate AN1 is provided to an output of a flip-flop FF1 constituting the Run-Stop register 151. The falling edge detection circuit detects a falling edge from 1 to 0 of an output of the Run-Stop register 151 and generates a pulse signal (RTKP) that outputs 1 during one clock cycle. A symbol o at an input terminal of the AND gate AN1 represents that an inversion signal is inputted. The pulse signal (RTKP) is inputted into a clear terminal of a flip-flop FF3 through an OR gate OR1, and the Door bell register 152 is cleared. The Door bell register 152 is cleared also by a transfer completion notification signal (TKTP) from the transfer control unit 16. Write data (Write Data) is written to the Run-Stop register 151 and the Door bell register 152 when their write enable (WE) signal is 1. The Run-Stop register 151 in FIG. 10 consists of a D-type flip-flop having an enable terminal (en), the Door bell register 152 consists of a D-type flip-flop having a set terminal (set) and a clear terminal (clear), and the flip-flop FF1 consists of a D-type flip-flop. The triangle of the flip-flop in FIG. 9 represents a clock input terminal, and a clock signal not shown in FIG. 9 is inputted into the clock input terminal.

As defined in 5. 4. 5 on page 23 of JEDEC STANDARD Universal Flash Storage Host Controller Interface (UFSHCI) Version 2.1 (JESD223C), even when the Run-Stop register 151 is 0, the transfer control unit 16 needs to continue a transfer request in process (outstanding transfer request), so that the transfer control unit 16 does not notify the transfer protocol unit 17 in particular.

Step S8B: Even when the Run-Stop register 151 becomes 0, this is not notified to the UFS device 20, so that the UFS device 20 continues normal operation and issues RTT.

Step S9B: The transfer protocol unit 17 transmits data corresponding to the RTT by the data output (Data Out UPIU).

Step S10B: The CPU 11 that executes the application writes 1 into the Run-Stop register 151.

Step S11B: In the same manner as in step S2, the CPU 11 that executes the application registers transfer to the UTP transfer request descriptor and the Door bell register 152. At this time point, as shown in FIG. 8, the transfer content 2 is written to the UTP Transfer Request Descriptor, so that a discrepancy occurs between content (transfer content 1) where the transfer protocol unit 17 is performing transfer and content (transfer content 2) of the UTP Transfer Request Descriptor.

Step S12B: The clear of the Door bell register 152 is notified to the transfer control unit 16.

Step S13B: The transfer control unit 16 receives clear notification of the Door bell register 152 and instructs the transfer protocol unit 17 to perform the next transfer.

Step S14B: The transfer protocol unit 17 receives instruction from the transfer control unit 16 and issues a WRITE6 command.

Step S15B: In parallel with step S12B, the UFS device 20 issues the next RTT. Thereafter, the UFS device 20 waits for data output (Data Out UPIU), so that the UFS device 20 does not receive the WRITE6 command of step S14B.

Step S16B: Although the RTT reaches the transfer protocol unit 17, the task tag of the RTT is different, so that the RTT is discarded. Thereafter, the transfer protocol unit 17 waits for RTT (step S17B).

In the above operation, a problem occurs where processing stops while waiting for completion of transfer. Further, at a time point when the transfer content 2 is written, the transfer content 1 is being transferred, and if the transfer is completed, a result is written to the UTP Transfer Request Descriptor of the transfer content 2, so that a wrong transfer result is reported to the application.

In the embodiment, after the application writes 0 to the Run-Stop register, the next transfer is prevented from being registered until an in-process transfer is completed.

Thereby, the next transfer is registered after the in-process transfer is completed, so that the next transfer registration does not overlap with the in-process transfer, and inside of the transfer control unit 16 and the transfer state of the UFS device 20 become unique. Therefore, information is not destroyed and operation does not stop.

First Example

Figure 10:
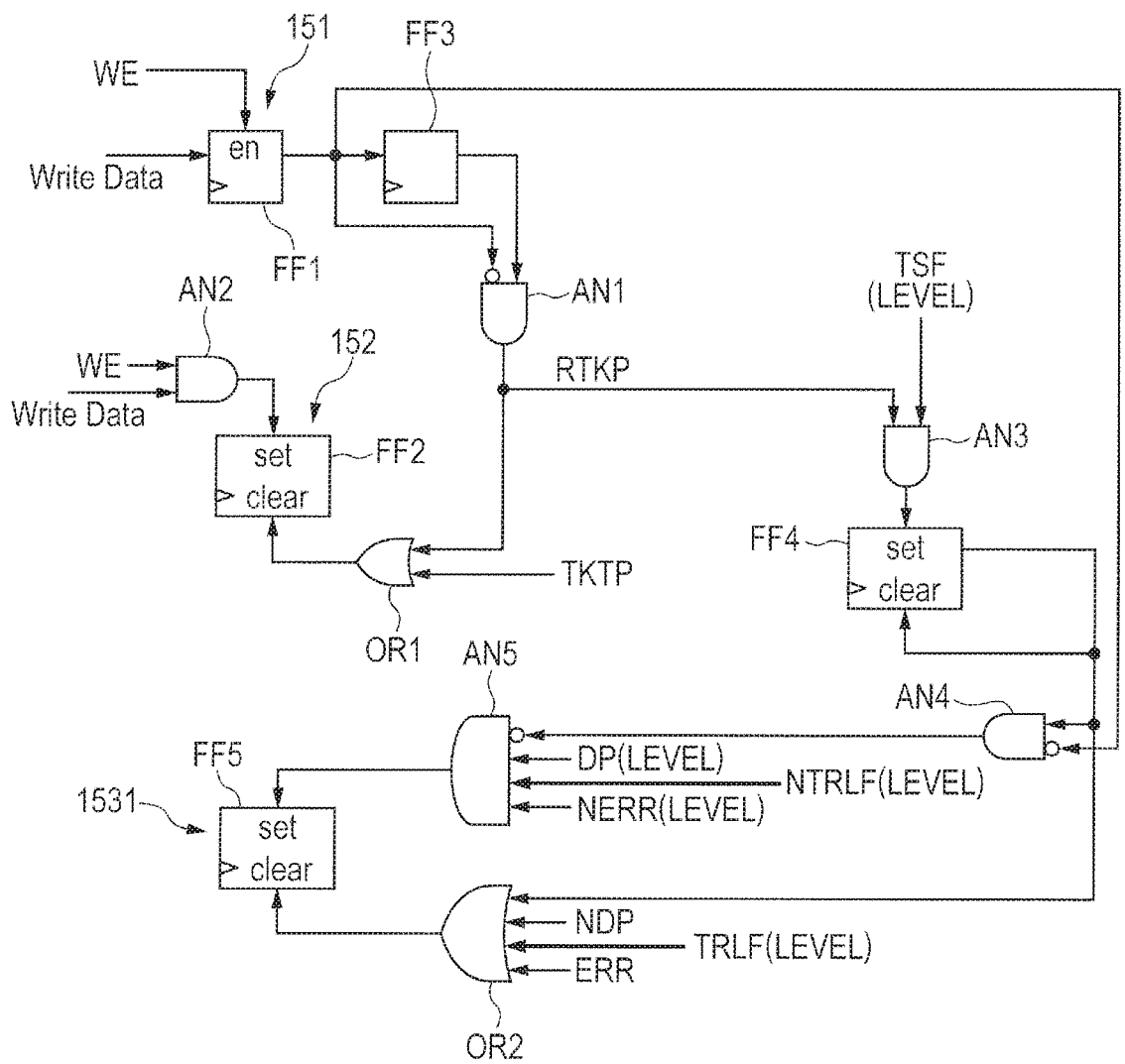
FIG. 10 is a logic circuit diagram showing a Run-Stop register, a door bell register, a ready bit, and their control system of a first example.
Figure 11:
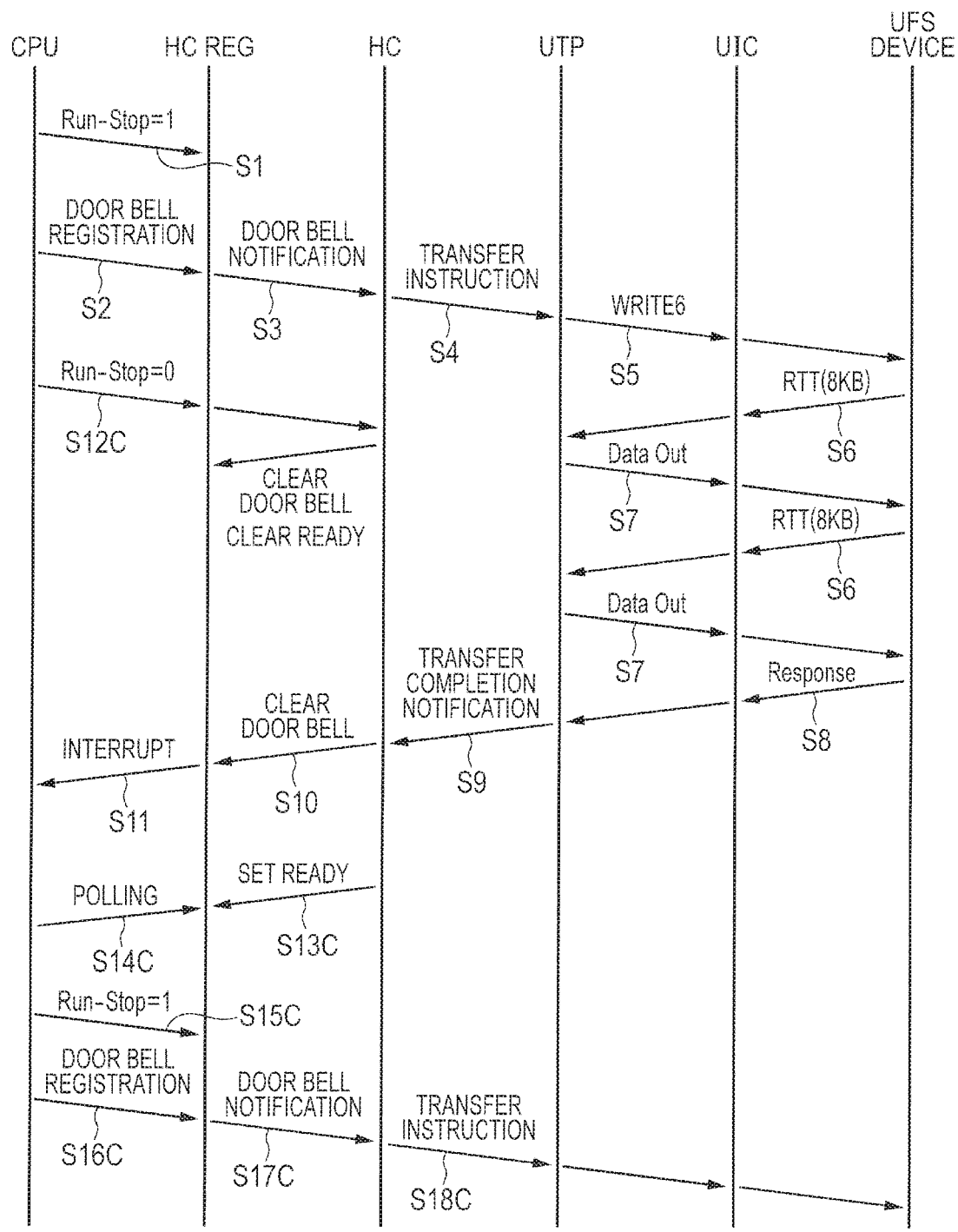
FIG. 11 is a flow diagram showing an example of a case where the Run-Stop register is cleared in the middle of the write operation in FIG. 3 in the first example.

A first example of the embodiment will be described with reference to FIGS. 10 to 12. FIG. 10 is a logic circuit diagram showing a Run-Stop register, a door bell register, a ready bit, and their control system of the first example. FIG. 11 is a flow diagram showing an example of a case where the Run-Stop register is cleared in the middle of the write operation in FIG. 3 in the first example. FIG. 12 is a diagram showing values of registers and UTP transfer request descriptor in the write operation in FIG. 11.

The first example includes, in addition to the circuit of the comparative example in FIG. 9, a flip-flop FF4 that is set to 1 when the pulse signal (RTKP) is generated (an AND gate AN3 becomes 1) when a transfer in-process flag (TSF) indicating that the transfer from the transfer control unit 16 is in process is set. When the flip-flop FF4 is set to 1, a flip-flop FF5 constituting the ready bit 1531 is cleared to 0. The flip-flop FF4 is cleared to 0 after one clock from when being set to 1.

As prescribed in 5. 3. 3 on page 17 of JEDEC STANDARD Universal Flash Storage Host Controller Interface (UFSHCI) Version 2.1 (JESD223C), the flip-flop FF5 is cleared to 0 when any of the following conditions is satisfied, that is, when an OR gate OR2=1.
(1) When a pulse signal (NPD) indicating that the UFS device 20 is not detected is 1.
(2) When a signal (TRLF) indicating that the UTP Transfer Request List is full is 1.
(3) When a pulse signal (ERR) indicating that there is an error in the UFS host controller 13 or the UFS device 20 is 1.

On the other hand, the flip-flop FF5 is set to 1 when all of the following conditions are satisfied, that is, when an AND gate AN5=1.
(1) When an output of an AND gate AN4 is 1 (when the Run-Stop register 151 is set or when the flip-flop FF4 is cleared to 0).
(2) When a signal (DP) detecting the presence of the UFS device 20 is 1.
(3) When a signal (NTRLF) indicating that the UTP Transfer Request List is not full is 1.
(4) When a pulse signal (NERR) indicating that there is no error in the UFS host controller 13 and the UFS device 20 is 1.

The flip-flop FF4 and the flip-flop FF5 constituting the ready bit 1531 in FIG. 10 consist of a D-type flip-flop having a set terminal (set) and a clear terminal (clear). The triangle of the flip-flop in FIG. 10 also represents a clock input terminal, and a clock signal not shown in FIG. 10 is inputted into the clock input terminal.

Thereby, if there is an in-process transfer when 0 is written to the Run-Stop register 151, it is possible to prevent the ready bit 1531 from being 1 until the in-process transfer is completed.

An operation in a case where 0 is written to the Run-Stop register 151 during the write operation in FIG. 3 in a configuration of the first example will be described with reference to FIGS. 11 and 12.

Steps S1 to S11 are the same as those of the write operation of FIG. 3.

Step S12C: When the software of the UFS host 10 writes 0 to the Run-Stop register 151 during a write transfer, the Door bell register 152 and the ready bit 1531 are cleared to 0 by the configuration of the present example.

Step S13C: When the in-process transfer is completed, the transfer control unit 16 sets the ready bit 1531 to 1 by resetting the transfer in-process flag (TSF).

Step S14C: The CPU 11 that executes the application detects that the ready bit 1531 becomes 1 by polling.

Step S15C: The CPU 11 that executes the application writes 1 to the Run-Stop register 151.

Step S16C: In the same manner as in step S2, the CPU 11 that executes the application registers the UTP transfer request descriptor and the Door bell register 152. Here, as shown in FIG. 12, the transfer content 2 is written to the UTP Transfer Request Descriptor.

Step S17C and the following steps are the same as step S3 and the following steps.

JEDEC STANDARD Universal Flash Storage Host Controller Interface (UFSHCI) Version 2.1 (JESD223C) prescribes that 1 cannot be written to the Run-Stop register (UTRLRSR) unless the ready bit (UTRLRDY) is 1, so that when there is an in-process transfer, the ready bit 1531 is cleared to 0 so as not to write 0 to the next Run-Stop register by using a function of the present example. Thereby, it is possible to normally complete the in-process transfer without registering the next transfer and without generating a coexistence of the in-process transfer and information/data.

Second Example

Figure 13:
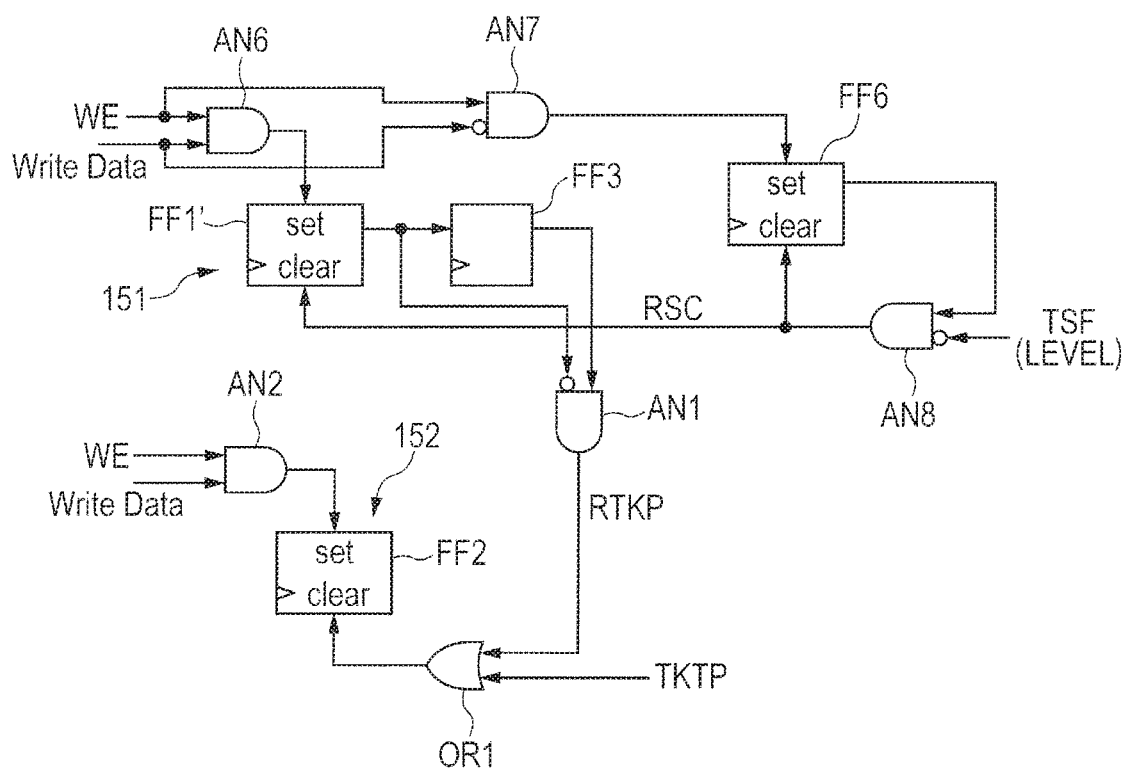
FIG. 13 is a logic circuit diagram showing a Run-Stop register, a door bell register, and their control system of a second example.
Figure 14:
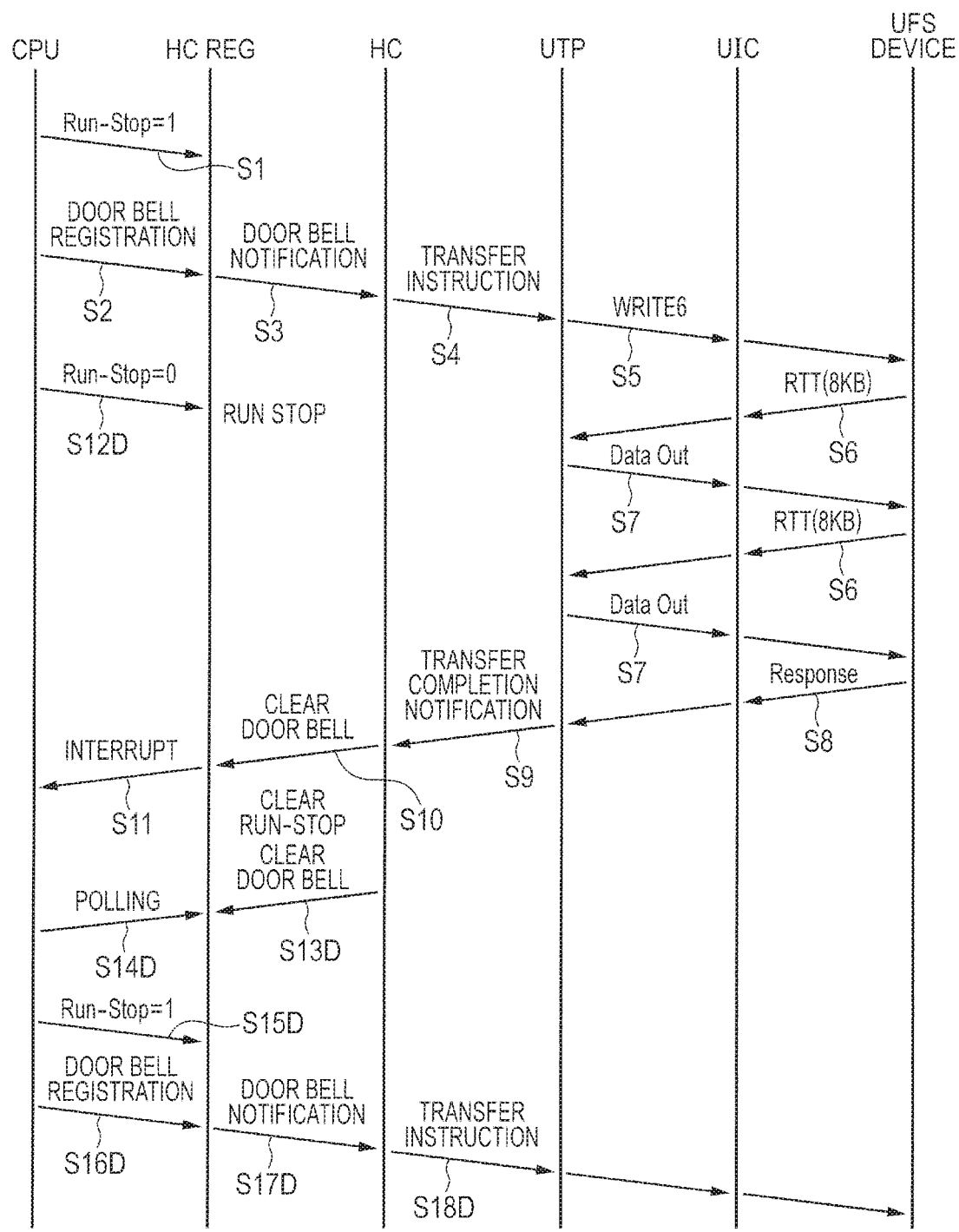
FIG. 14 is a flow diagram showing an example of a case where the Run-Stop register is cleared in the middle of the write operation in FIG. 3 in the second example.

A second example of the embodiment will be described with reference to FIGS. 13 to 15. FIG. 13 is a logic circuit diagram showing a Run-Stop register, a door bell register, and their control system of the second example. FIG. 14 is a flow diagram showing an example of a case where the Run-Stop register is cleared in the middle of the write operation in FIG. 3 in the second example. FIG. 15 is a diagram showing values of registers and UTP transfer request descriptor in the write operation in FIG. 14.

In the second example, in addition to the circuit of the comparative example in FIG. 9, a circuit (AND gates AN7 and AN8 and flip-flop FF6) that detects that 0 is going to be written to the Run-Stop register 151 is provided, and a flip-flop FF1' constituting the Run-Stop register 151 consists of a D-type flip-flop having a set terminal (set) and a clear terminal (clear). When writing 1 to the Run-Stop register 151, the flip-flop FF1' is set to 1 by an AND gate AN6 to which a write enable signal (WE) and write data (Write Data) are inputted. When writing 0 to the Run-Stop register 151, the flip-flop FF6 is set to 1 by the AND gate AN7 to which the write enable signal (WE) and an inversion signal of the write data (Write Data) are inputted, and when the transfer in-process flag (TSF) is not set, a clear signal (RSC) of the Run-Stop register becomes 1 and the flip-flop FF1' is cleared to 0. When the transfer in-process flag (TSF) is set, the clear signal (RSC) of the Run-Stop register becomes 0 and the flip-flop FF1' is not cleared to 0. The flip-flop FF6 consists of a D-type flip-flop having a set terminal (set) and a clear terminal (clear).

Thereby, even when the CPU tries to write 0 to the Run-Stop register 151, if there is an in-process transfer, it is possible to prevent the Run-Stop register 151 from being 0.

An operation in a case where 0 is written to the Run-Stop register 151 during the write operation in FIG. 3 in a configuration of the second example will be described with reference to FIGS. 14 and 15.

Steps S1 to S11 are the same as those of the write operation of FIG. 3.

Step S12D: Even when the software of the UFS host 10 tries to write 0 to the Run-Stop register 151 during a write transfer, 0 is not written to the Run-Stop register 151 due to the configuration of the present example, the Run-Stop register 151 and the Door bell register 152 do not change, and the transfer is continued. The Run-Stop register 151 do not become 0, so that the CPU 11 that executes the application cannot detect completion of the write and becomes a waiting state. The CPU 11 that executes the application performs polling until the Run-Stop register 151 becomes 0.

Step S13D: When the in-process transfer is completed, the transfer control unit 16 clears the transfer in-process flag (TSF) and clears the Run-Stop register 151. In the next cycle, the Door bell register 152 is also cleared.

Step S14D: The CPU 11 that executes the application detects that the Run-Stop register 151 becomes 0 by polling.

Step S15D: The CPU 11 that executes the application writes 1 to the Run-Stop register 151.

Step S16D: In the same manner as in step S2, the CPU 11 that executes the application registers the UTP transfer request descriptor and the Door bell register 152. Here, as shown in FIG. 15, the transfer content 2 is written to the UTP Transfer Request Descriptor.

Step S17D and the following steps are the same as step S2 and the following steps.

Even when the software of the UFS host 10 tries to write 0 to the Run-Stop register 151 during transfer, 0 is not immediately reflected, so that the Run-Stop register 151 and the Door bell register 152 hold previous states so as to prevent the application from registering the next transfer. The next transfer is not registered, so that a mixture of information and data with those of the current transfer does not occur and the transfer can be normally completed.

Third Example

Figure 16:
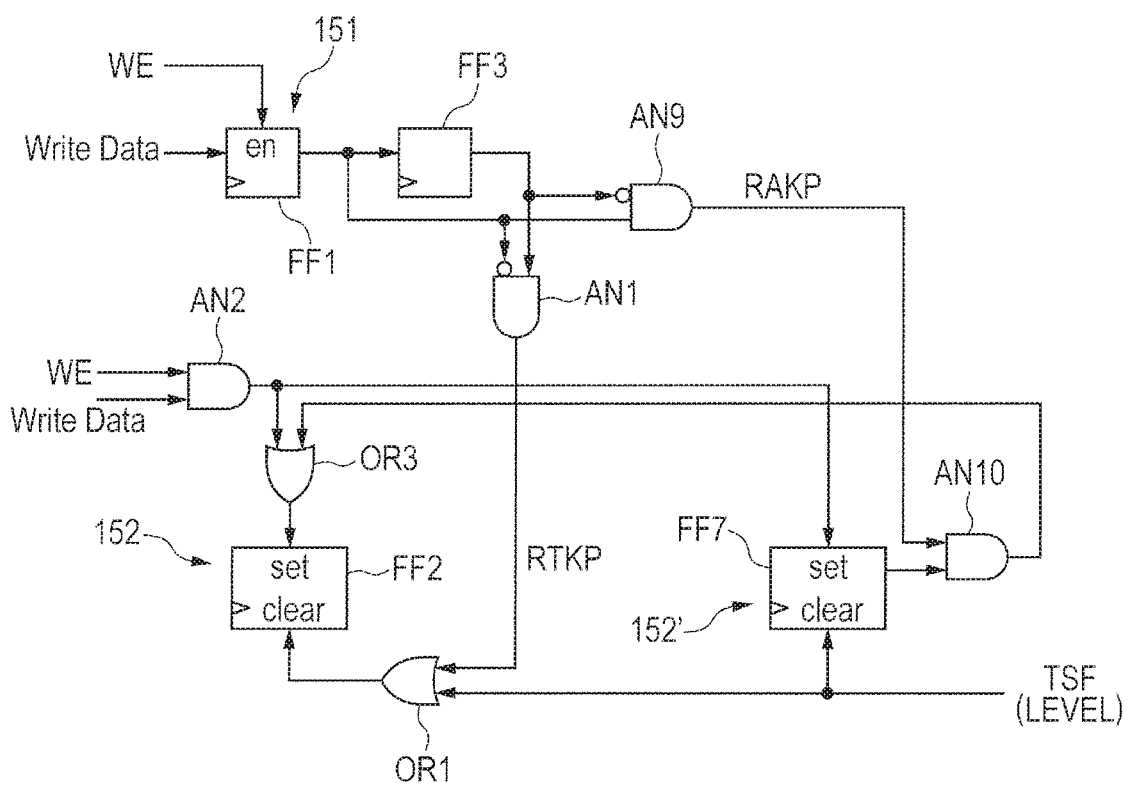
FIG. 16 is a logic circuit diagram showing a Run-Stop register, a door bell register, and their control system of a third example.
Figure 17:
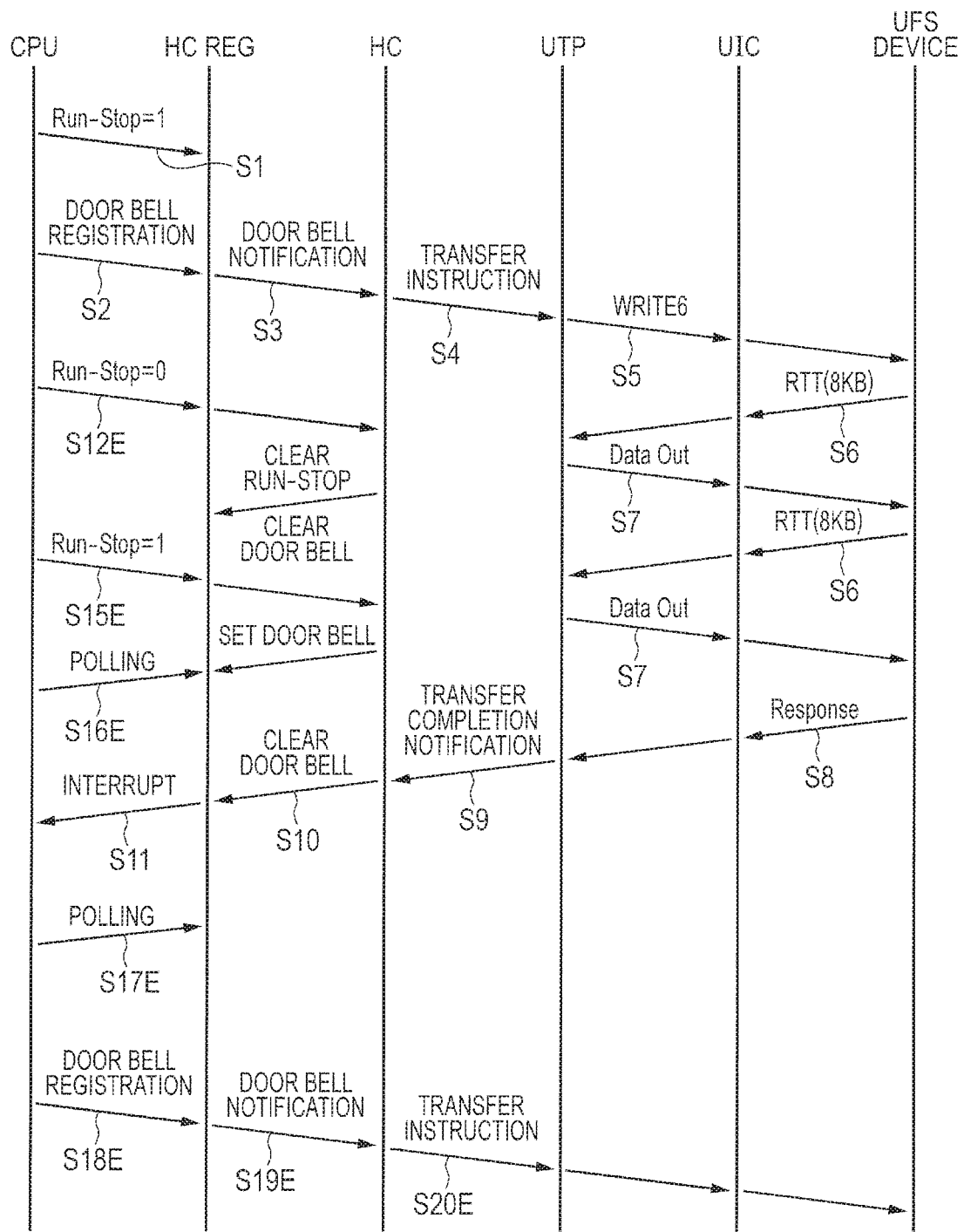
FIG. 17 is a flow diagram showing an example of a case where the Run-Stop register is cleared in the middle of the write operation in FIG. 3 in the third example.

A third example of the embodiment will be described with reference to FIGS. 16 to 18. FIG. 16 is a logic circuit diagram showing a Run-Stop register, a door bell register, and their control system of the third example. FIG. 17 is a flow diagram showing an example of a case where the Run-Stop register is cleared in the middle of the write operation in FIG. 3 in the third example. FIG. 18 is a diagram showing values of registers and UTP transfer request descriptor in the write operation in FIG. 17.

The third example includes, in addition to the circuit of the comparative example in FIG. 9, a flip-flop FF7 constituting an internal Door bell register 152' that holds an internal in-process state regardless of the value of the Run-Stop register 151 and a mechanism (AND gate AN9, AND gate AN10, and OR gate OR3) that writes back a value of the internal Door bell register 152' to the Door bell register 152 by writing 1 to the Run-Stop register 151.

The flip-flop FF7 is set at the same time as when the Door bell register 152 is set. However, the flip-flop FF7 is not cleared by the pulse signal (RTKP) that clears the Door bell register 152. The flip-flop FF7 is not cleared as long as the transfer in-process flag (TSF) is set. The flip-flop FF7 consists of a D-type flip-flop having a set terminal (set) and a clear terminal (clear).

The flip-flop FF3 and the AND gate AN9 constitutes a rising edge detection circuit. The rising edge detection circuit detects a rising edge of 0 to 1 of the output of the Run-Stop register 151, and generates a pulse signal (RAKP) that outputs 1 during one clock cycle. When the flip-flop FF7 is set and the pulse signal (RAKP) becomes 1 (the AND gate AN10 becomes 1), the OR gate OR3 becomes 1 and the Door bell register 152 is set.

By this configuration, when the Run-Stop register is changed from 1 to 0 to 1 while the transfer is in process, the operations described below are performed.

(1) When the Run-Stop register 151 is set to 0, the Door bell register 152 is cleared to 0 as defined by standard.
(2) When the Run-Stop register 151 is set to 1 for the second time, if the transfer is in process, the Door bell register 152 is set to 1.

Steps S1 to S11 are the same as those of the write operation of FIG. 3.

Step S12E: When the software of the UFS host 10 writes 0 to the Run-Stop register 151 during a write transfer, the Run-Stop register 151 and the Door bell register 152 are cleared to 0 by the configuration of the present example. In this case, the value of the internal Door bell register 152' is not cleared.

Step S15E: The CPU 11 that executes the application writes 1 into the Run-Stop register 151. In this case, the value of the internal Door bell register 152' is written into the Door bell register 152.

Step S16E: The CPU 11 that executes the application polls a Door bell value that is desired to be registered. In this example, a case is described where the Door bell register 152 used in steps S1 to S11 is desired to be used. In this case, the CPU 11 performs polling until the Door bell register 152 is cleared. There are 32 Door bell registers, so that if another Door bell register can be used, at this time point, the CPU 11 performs registration on the other Door bell register.

Step S17E: The CPU 11 detects, by polling, that the Door bell register 152 is cleared. Thereby, the CPU 11 detects that the next transfer becomes possible.

Step S18E: In the same manner as in step S2, the CPU 11 that executes the application registers the UTP transfer request descriptor and the Door bell register 152. Here, as shown in FIG. 18, the transfer content 2 is written to the UTP Transfer Request Descriptor.

Step S19E and the following steps are the same as step S3 and the following steps.

By the operation described above, after the Run-Stop register 151 is set to 1 for the second time, it is possible to normally complete the transfer while complying with standard without performing additional Door bell registration and without generating the mixture of information and data.

While the invention made by the inventors has been specifically described based on the embodiment and the examples, it is needless to say that the present invention is not limited to the embodiments and the examples and may be variously modified.

For example, while an example where the UFS host is formed of one semiconductor chip is described in the embodiment, only the UFS controller may be formed of one semiconductor chip, the UFS controller and the CPU may be formed of one semiconductor chip, and the UFS controller and a memory may be formed of one semiconductor chip.

What is claimed is:

1. A semiconductor device that performs data transfer with a Universal Flash Storage (UFS) device, the semiconductor device comprising:
   a Central Processing Unit (CPU);
   a UFS host controller;
   a memory that stores a transfer request list describing processing of the data transfer;
   a Run-Stop register that is set a first value indicating the processing is executable or a second value not indicating the processing is executable; and
   a Door bell register that is set a third value instructing the UFS host controller to perform the data transfer according to the transfer request list or a fourth value not instructing the UFS host controller to perform the data transfer according to the transfer request list, the fourth value being set in the Door bell register when the second value is set in the Run-stop register,
   wherein, when the data transfer is performed, the CPU sets the first value in the Run-stop register and sets the third value in the Door bell register, and
   wherein, when the CPU sets the second value in the Run-stop register while the data transfer is in process, the UFS host controller prevents the Run-stop register to be set the first value or the Door bell register to be set the third value instructing to perform a next data transfer until the data transfer is completed.

2. The semiconductor device according to claim 1, further comprising a ready bit that is set a fifth value indicating the Run-stop register can be set to the first value or a sixth value not indicating the Run-stop register can be set to the first value,
   wherein, when the data transfer is performed, the UFS host controller sets the fifth value in the ready bit, and
   wherein, when the CPU sets the second value in the Run-stop register while the data transfer is in process, the UFS host controller prevents the next data transfer by setting the sixth value in the ready bit.

3. The semiconductor device according to claim 2, wherein, when the Run-Stop register is set the second value while the data transfer is in process, the UFS host controller does not set the fifth value to the ready bit until the data transfer is completed.

4. The semiconductor device according to claim 1, further comprising an internal Door bell register that is set a seventh value to hold a transfer state when the Door bell register is set the third value, or an eighth value to hold the transfer state when the Door bell register is set the fourth value, and even when the Run-Stop register is set the second value while the data transfer is in process, the seventh value of the internal Door bell register is held,
   wherein, when the CPU sets the second value in the Run-stop register while the data transfer is in process, the UFS host controller writes back a value of the internal Door bell register to the Door bell register.

5. The semiconductor device according to claim 4, wherein, when the CPU sets the second value in the Run-stop register while the data transfer is in process, the UFS host controller writes back the seventh value of the internal Door bell register to the Door bell register.

6. The semiconductor device according to claim 1, further comprising a transfer in-process flag (TSF) that is set a ninth value indicating the data transfer from the UFS host controller is in process or a tenth value not indicating the data transfer from the UFS host controller is in process, wherein, when the data transfer is performed, the UFS host controller sets the ninth value in the transfer in-process flag, and wherein, when the CPU sets the second value in the Run-stop register, the UFS host controller prevents the next data transfer based on the transfer in-process flag.

7. A semiconductor device that performs data transfer with a universal flash storage (UFS) device, the semiconductor device comprising:

a Central Processing Unit (CPU);

a transfer control unit;

a memory that stores a transfer request list describing processing of the data transfer;

a Run-Stop register that is set a first value indicating the processing is executable or a second value not indicating the processing is executable; and a Door bell register that is set a third value instructing the transfer control unit to perform the data transfer according to the transfer request list or a fourth value not instructing the transfer control unit to perform the data transfer according to the transfer request list, the fourth value being set in the Door bell register when the second value is set in the Run-stop register, wherein, when the data transfer is performed, the CPU sets the first value in the Run-stop register and sets the third value in the Door bell register, and wherein, when the CPU sets the second value in the Run-stop register while the data transfer is in process, the transfer control unit prevents the Run-stop register to be set the first value or the Door bell register to be set the third value instructing to perform a next data transfer until the data transfer is completed.

8. The semiconductor device according to claim 7, further comprising a ready bit that is set a fifth value indicating the Run-stop register can be set to the first value or a sixth value not indicating the Run-stop register can be set to the first value, wherein, when the data transfer is performed, a UFS host controller sets the fifth value in the ready bit, and wherein, when the CPU sets the second value in the Run-stop register while the data transfer is in process, the transfer control unit prevents the next data transfer by setting the sixth value in the ready bit.

9. The semiconductor device according to claim 8, wherein, when the Run-Stop register is set the second value while the data transfer is in process, the transfer control unit does not set the fifth value to the ready bit until the data transfer is completed.

10. The semiconductor device according to claim 7, further comprising an internal Door bell register that is set a seventh value to hold a transfer state when the Door bell register is set the third value, or an eighth value to hold the transfer state when the Door bell register is set the fourth value, and even when the Run-Stop register is set the second value while the data transfer is in process, the seventh value of the internal Door bell register is held, wherein, when the CPU sets the second value in the Run-stop register while the data transfer is in process, the transfer control unit writes back a value of the internal Door bell register to the Door bell register.

11. The semiconductor device according to claim 10, wherein, when the CPU sets the second value in the Run-stop register while the data transfer is in process, the transfer control unit writes back the seventh value of the internal Door bell register to the Door bell register.

12. A UFS system comprising:

a universal flash storage (UFS) device, and a UFS host that controls data transfer with the UFS device, wherein the UFS host includes a Central Processing Unit (CPU), a UFS host controller, a Run-Stop register that sets the UFS host controller into a processing possible state, and a Door bell register that is set a third value instructing the UFS host controller to perform the data transfer according to a transfer request list or a fourth value not instructing the UFS host controller to perform the data transfer according to the transfer request list, the fourth value being set in the Door bell register when a second value is set in the Run-stop register, and wherein, when the data transfer is performed, the CPU sets a first value in the Run-stop register and sets the third value in the Door bell register, and wherein, when the CPU sets the second value in the Run-stop register while the data transfer is in process, the UFS host controller prevents the Run-stop register to be set the first value or the Door bell register to be set the third value instructing to perform a next data transfer until the data transfer is completed.

13. The UFS system according to claim 12, further comprising a ready bit that is set a fifth value indicating the Run-stop register can be set to the first value or a sixth value not indicating the Run-stop register can be set to the first value, wherein, when the data transfer is performed, the UFS host controller sets the fifth value in the ready bit, and wherein, when the CPU sets the second value in the Run-stop register while the data transfer is in process, the UFS host controller prevents the next data transfer by setting the sixth value in the ready bit.

14. The UFS system according to claim 12, further comprising an internal Door bell register that is set a seventh value to hold a transfer state when the Door bell register is set the third value, or an eighth value to hold the transfer state when the Door bell register is set the fourth value, and even when the Run-Stop register is set the second value while the data transfer is in process, the seventh value of the internal Door bell register is held, wherein, when the CPU sets the second value in the Run-stop register while the data transfer is in process, the UFS host controller writes back a value of the internal Door bell register to the Door bell register.

* * * * *